US 012127545B2

(12) United States Patent
Drake et al.

(10) Patent No.: US 12,127,545 B2
(45) Date of Patent: Oct. 29, 2024

(54) PEST CONTROL DEVICE MOUNTING SYSTEM

(71) Applicant: Ecolab USA Inc., Saint Paul, MN (US)

(72) Inventors: Ryan Joseph Drake, White Bear Lake, MN (US); Douglas Brian Gardner, Maplewood, MN (US); Brandon Matthew Carlson, Farmington, MN (US); Joshua Lanz, Rochester, MN (US); Alexander Roy Nee, Eagan, MN (US); Jason David Hedlund, Lake Elmo, MN (US); Kenneth Thomas Dobizl, Mounds View, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 17/698,628

(22) Filed: Mar. 18, 2022

(65) Prior Publication Data

US 2022/0386587 A1 Dec. 8, 2022

Related U.S. Application Data

(63) Continuation of application No. 16/392,358, filed on Apr. 23, 2019, now Pat. No. 11,317,619.

(Continued)

(51) Int. Cl.
*A01M 25/00* (2006.01)
*A01M 1/02* (2006.01)
(Continued)

(52) U.S. Cl.
CPC .............. *A01M 1/24* (2013.01); *A01M 1/026* (2013.01); *A01M 23/245* (2013.01); *A01M 1/14* (2013.01);
(Continued)

(58) Field of Classification Search
CPC .. A01M 25/004; A01M 1/026; A01M 25/002; A01M 23/245; A01M 1/24;
(Continued)

(56) References Cited

U.S. PATENT DOCUMENTS 1,525,401 A    2/1925  King
1,870,712 A *  8/1932  Crown ................. A01M 1/2011
                                                        43/119

(Continued)

FOREIGN PATENT DOCUMENTS

AU    2007100803    9/2007
AU    2012276298    2/2014

(Continued)

OTHER PUBLICATIONS

"Knock Off Baitbox Rat Mouse Dual Bait with Rat Trap", Boerenwinkel. nl, [Online] Retrieved from the Internet: URL: https: www. boerenwinkel.nl en product 2853 16529 pest-control without-venom knock-off-baitbox-rat-mouse-dual-bait-with-rat-trap, (Retrieved on Apr. 17, 2019), 3 pgs.

(Continued)

*Primary Examiner* — Bradley Duckworth
(74) *Attorney, Agent, or Firm* — Schwegman Lundberg & Woessner, P.A.

(57) ABSTRACT

Method and apparatus for a pest control device mounting system configured for mounting pest control devices in a building and using them to control pests. The pest control device mounting system including a mounting bracket, which may have a circumferential portion defining a portal. In some examples, the mounting bracket includes a flange portion suitable for attaching to the perimeter of a cavity in a building surface. The pest control device mounting system including a plug configured to be removably attached to the mounting bracket and to substantially close the portal when (Continued)

attached to the mounting bracket, wherein the plug is configured to accommodate a pest control device.

20 Claims, 13 Drawing Sheets

Related U.S. Application Data

(60) Provisional application No. 62/671,552, filed on May 15, 2018.

(51) Int. Cl.
  *A01M 1/24*      (2006.01)
  *A01M 23/24*     (2006.01)
  *A01M 1/14*      (2006.01)
  *A01M 23/00*     (2006.01)
  *A01M 23/02*     (2006.01)

(52) U.S. Cl.
  CPC ........... *A01M 23/005* (2013.01); *A01M 23/02* (2013.01); *A01M 25/002* (2013.01)

(58) Field of Classification Search
  CPC ...... A01M 1/14; A01M 23/005; A01M 23/02; E04B 1/72; F21V 21/04
  See application file for complete search history.

(56) References Cited

U.S. PATENT DOCUMENTS

| | | | |
|---|---|---|---|
| 2,651,138 A | 9/1953 | Malloy | |
| 4,178,578 A | 12/1979 | Hall | |
| 4,208,829 A | 6/1980 | Manning | |
| 4,212,128 A | 7/1980 | Vance | |
| 4,462,182 A | 7/1984 | French | |
| 4,815,231 A | 3/1989 | McQueen | |
| 5,430,662 A | 7/1995 | Ahonen | |
| 5,966,863 A | 10/1999 | Payton et al. | |
| 5,979,108 A | 11/1999 | Adams | |
| 6,164,010 A | 12/2000 | Snell et al. | |
| 6,389,738 B1 | 5/2002 | Denny et al. | |
| 6,513,283 B1 | 2/2003 | Crossen | |
| 6,671,999 B1 | 1/2004 | Doucette | |
| 6,874,274 B2 | 4/2005 | Townsend | |
| 6,877,270 B2 | 4/2005 | Nelson et al. | |
| 7,051,473 B2 * | 5/2006 | Hoppe | A01M 1/2011 43/131 |
| 7,165,353 B2 * | 1/2007 | Matts | A01M 1/2011 43/131 |
| 7,394,389 B2 * | 7/2008 | Nelson | A01M 31/002 340/573.2 |
| 7,874,098 B2 | 1/2011 | Vickery et al. | |
| 8,376,592 B2 * | 2/2013 | Engstrom | F21V 21/04 362/404 |
| 8,387,305 B2 | 3/2013 | Cink et al. | |
| 8,701,594 B2 | 4/2014 | Vickery et al. | |
| 9,504,243 B1 * | 11/2016 | Barto | A01M 23/08 |
| 9,730,437 B2 | 8/2017 | Marks et al. | |
| 9,826,730 B2 | 11/2017 | Vickery et al. | |
| 10,888,083 B2 * | 1/2021 | Waiker | F16M 13/027 |
| 11,317,619 B2 * | 5/2022 | Drake | A01M 23/245 |
| 2002/0043018 A1 | 4/2002 | Townsend | |
| 2004/0200131 A1 | 10/2004 | Middlebrook et al. | |
| 2004/0200133 A1 | 10/2004 | Townsend | |
| 2005/0102890 A1 | 5/2005 | Hoppe et al. | |
| 2006/0117644 A1 | 6/2006 | Hoyes et al. | |
| 2008/0072475 A1 | 3/2008 | Nelson et al. | |
| 2009/0090045 A1 * | 4/2009 | Baker | A01M 1/026 43/132.1 |
| 2009/0139133 A1 * | 6/2009 | Harper | A01M 25/004 43/131 |
| 2009/0307963 A1 | 12/2009 | Abbas | |
| 2010/0031557 A1 | 2/2010 | Vickery et al. | |
| 2010/0050498 A1 | 3/2010 | Tarara et al. | |
| 2010/0162614 A1 | 7/2010 | Cink et al. | |
| 2010/0170140 A1 | 7/2010 | Cink et al. | |
| 2010/0170141 A1 | 7/2010 | Cink et al. | |
| 2010/0257774 A1 | 10/2010 | Middlebrook et al. | |
| 2011/0041383 A1 | 2/2011 | Cink et al. | |
| 2011/0072709 A1 | 3/2011 | Patterson et al. | |
| 2011/0239526 A1 | 10/2011 | Nelson et al. | |
| 2012/0297663 A1 | 11/2012 | Middlebrook et al. | |
| 2014/0115950 A1 | 5/2014 | Chornenky | |
| 2014/0220859 A1 | 8/2014 | Mccutchan | |
| 2014/0291474 A1 * | 10/2014 | Wilson | A01M 29/10 248/544 |
| 2015/0173345 A1 | 6/2015 | Morris et al. | |
| 2018/0146657 A1 | 5/2018 | Reilly | |
| 2019/0029246 A1 | 1/2019 | Kletzli et al. | |
| 2019/0037829 A1 * | 2/2019 | Laut | H01H 1/242 |
| 2019/0053482 A1 | 2/2019 | Holland et al. | |
| 2019/0124913 A1 | 5/2019 | Power | |
| 2019/0350186 A1 | 11/2019 | Drake et al. | |
| 2020/0337293 A1 | 10/2020 | Nee et al. | |

FOREIGN PATENT DOCUMENTS

| | | |
|---|---|---|
| AU | 2016100772 | 7/2016 |
| BR | 202017024066 | 3/2019 |
| CN | 1585428 | 2/2005 |
| CN | 101516184 | 8/2009 |
| CN | 201491040 | 5/2010 |
| CN | 102223787 | 10/2011 |
| CN | 102893981 | 1/2013 |
| CN | 106245949 | 12/2016 |
| CN | 206433631 | 8/2017 |
| CN | 206481397 | 9/2017 |
| CN | 206949360 | 2/2018 |
| CN | 206977863 | 2/2018 |
| CN | 207083975 | 3/2018 |
| CN | 108142403 | 6/2018 |
| CN | 207544177 | 6/2018 |
| CN | 207610722 | 7/2018 |
| CN | 207754419 | 8/2018 |
| CN | 208186748 | 12/2018 |
| CN | 208533834 | 2/2019 |
| CN | 112087948 | 12/2020 |
| DE | 202004008606 | 8/2004 |
| DE | 202012012766 | 12/2013 |
| DE | 102012013138 | 2/2014 |
| DE | 102020106163 | 9/2021 |
| EP | 0745323 | 12/1996 |
| EP | 2732704 | 5/2014 |
| EP | 3646727 | 5/2020 |
| FR | 2901455 | 1/2013 |
| HK | 1203297 | 10/2015 |
| JP | H09154465 | 6/1997 |
| JP | 2001190210 | 7/2001 |
| JP | 2003303693 | 10/2003 |
| JP | 2004097001 | 4/2004 |
| JP | 3604011 | 10/2004 |
| JP | 2005204632 | 8/2005 |
| JP | 2005218432 | 8/2005 |
| JP | 2007117070 | 5/2007 |
| JP | 5043153 | 7/2012 |
| JP | 2014045734 | 3/2014 |
| JP | 3190081 | 4/2014 |
| JP | 5574355 | 7/2014 |
| JP | 3195786 | 1/2015 |
| JP | 3199638 | 8/2015 |
| JP | 6277454 | 1/2018 |
| JP | 6309135 | 3/2018 |
| JP | 6383026 | 8/2018 |
| KR | 2003043843 | 6/2003 |
| KR | 101498887 | 3/2015 |
| KR | 2016150544 | 12/2016 |
| KR | 201702585 | 7/2017 |
| SE | 1151027 | 5/2013 |
| WO | 9903340 | 1/1999 |
| WO | 9963812 | 12/1999 |
| WO | 0137651 | 5/2001 |
| WO | 2008035304 | 3/2008 |

(56) References Cited

FOREIGN PATENT DOCUMENTS

| WO | 2010028378 | 3/2010 |
|---|---|---|
| WO | 2010033908 | 3/2010 |
| WO | 2011142739 | 11/2011 |
| WO | 2013000039 | 1/2013 |
| WO | 2019156575 | 8/2019 |
| WO | 2019222378 | 11/2019 |
| WO | 2020219779 | 10/2020 |

OTHER PUBLICATIONS

"Lockable rodent bait boxes lockable bait station plastic rat poison box box mousetrap mouse", AliExpress Shop1268791 Store, [Online] Retrieved from the Internet: URL: https: www.aliexpress.com store 1268791?spm=2114.12010615.0.0.25702e25FuaWw7, (Retrieved on Apr. 17, 2019), 6 pgs.
"International Application Serial No. PCT US2019 032459, International Search Report mailed Aug. 1, 2019", 2 pgs.
"International Application Serial No. PCT US2019 032459, Written Opinion mailed Aug. 1, 2019", 6 pgs.
"U.S. Appl. No. 16/392,358, Non Final Office Action mailed Feb. 21, 2020", 10 pgs.
"U.S. Appl. No. 16/392,358, Response filed May 21, 2020 to Non Final Office Action mailed Feb. 21, 2020", 10 pgs.
"U.S. Appl. No. 16/392,358, Final Office Action mailed Jun. 5, 2020", 10 pgs.
"International Application Serial No. PCT US2020 029666, International Search Report mailed Aug. 4, 2020", 4 pgs.
"International Application Serial No. PCT US2020 029666, Written Opinion mailed Aug. 4, 2020", 6 pgs.
"Bait Safe Technical Data—Installation", Make Safe Pty Ltd, (2012), 6 pgs.
"U.S. Appl. No. 16/392,358, Response filed Nov. 4, 2020 to Final Office Action mailed Jun. 5, 2020", 16 pgs.
"U.S. Appl. No. 16/392,358, Notice of Allowance mailed Nov. 17, 2020", 6 pgs.
"International Application Serial No. PCT US2019 032459, International Preliminary Report on Patentability mailed Nov. 26, 2020", 8 pgs.
"International Application Serial No. PCT NZ2019 050011, International Search Report mailed May 16, 2019", 5 pgs.
"One Click Mouse Trap", Nexxen s.r.o., [Online] Retrieved from the Internet on May 15, 2019: URL: https: web.archive.org web 20170805162048 http: www.made2catch.com made2catch-one-click-mouse-trap , (Aug. 5, 2017), 2 pgs.
"U.S. Appl. No. 16/392,358, Non Final Office Action mailed Mar. 3, 2021", 11 pgs.
"U.S. Appl. No. 16/392,358, Response filed Aug. 3, 2021 to Non Final Office Action mailed Mar. 3, 2021", 13 pgs.
"European Application Serial No. 19803602.2, Response filed Jun. 20, 2021 to Communication pursuant to Rules 161(2) and 162 EPC", 14 pgs.
"Australian Application Serial No. 2019271206, First Examination Report mailed Jul. 27, 2021", 4 pgs.
"U.S. Appl. No. 16/392,358, Notice of Allowance mailed Aug. 25, 2021", 5 pgs.
"U.S. Appl. No. 16/392,358, Corrected Notice of Allowability mailed Sep. 3, 2021", 2 pgs.
"International Application Serial No. PCT US2020 029666, International Preliminary Report on Patentability mailed Nov. 4, 2021", 8 pages.
"Chinese Application Serial No. 201980030655.4, Office Action mailed Nov. 15, 2021", with English translation, 23 pages.
"Chinese Application Serial No. 201980030655.4, Voluntary Amendment filed Apr. 6, 2021", (w English Translation of Claims), 15 pgs.
"U.S. Appl. No. 16/392,358, Notice of Allowance mailed Dec. 22, 2021", 5 pgs.
"European Application Serial No. 19803602.2, Extended European Search Report mailed Jan. 21, 2022", 7 pages.
"U.S. Appl. No. 16/857,142, Restriction Requirement mailed Mar. 17, 2022", 9 pgs.
"U.S. Appl. No. 16/392,358, Notice of Allowability mailed Mar. 31, 2022", 2 pgs.
"Chinese Application Serial No. 201980030655.4, Response filed May 13, 2022 to Office Action mailed Nov. 15, 2021", (w English Translation of Claims), 27 pgs.
"Canadian Serial No. 3,099,813, Response filed Apr. 29, 2022 to Office Action Mailed Dec. 30, 2021", 25 pgs.
"Australian Application Serial No. 2019271206, Response filed May 24, 2022 to First Examination Report mailed Jul. 27, 2021", 24 pgs.
"U.S. Appl. No. 16/857,142, Response filed Jun. 17, 2022 to Restriction Requirement mailed Mar. 17, 2022", 7 pgs.
"European Application Serial No. 19803602.2, Response filed Aug. 18, 2022 to Extended European Search Report mailed Jan. 21, 2022", 13 pgs.
"U.S. Appl. No. 16/857,142, Non Final Office Action mailed Sep. 22, 2022", 18 pgs.
"Canadian Serial No. 3,099,813, Office Action Mailed Dec. 30, 2021", 6 pgs.
"U.S. Appl. No. 16/857,142, Response filed Mar. 21, 2023 to Non Final Office Action mailed Sep. 22, 2022", 14 pgs.
"Brazil Application Serial No. BR1120200231339, Office Action mailed Mar. 21, 2023", with machine English translation, 8 pages.
"U.S. Appl. No. 16/857,142, Non Final Office Action mailed Jun. 28, 2023", 21 pgs.
"Brazil Application Serial No. BR1120200231339, Response filed Jun. 26, 2023 to Office Action mailed Mar. 21, 2023", w English claims, 17 pgs.
"U.S. Appl. No. 18/521,915, Preliminary Amendment filed Feb. 29, 2024", 6 pgs.

* cited by examiner

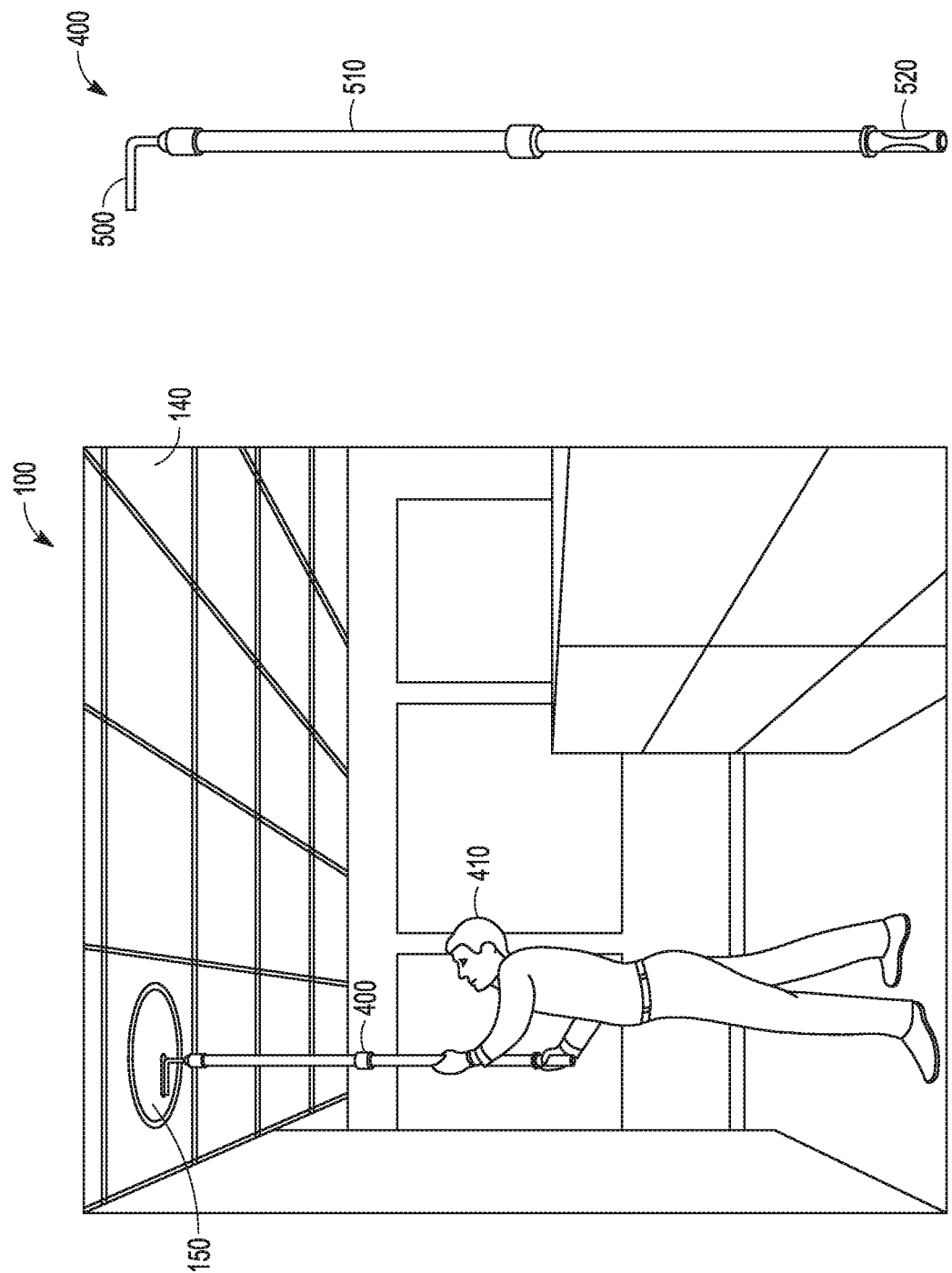

PEST CONTROL DEVICE MOUNTING SYSTEM

CLAIM OF PRIORITY

This patent application is a continuation of U.S. patent application Ser. No. 16/392,358, filed Apr. 23, 2019, which application claims the benefit of priority of U.S. Provisional Patent Application Ser. No. 62/671,552, entitled. "RODENT CEILING INNOVATION," filed on May 15, 2018 which are hereby incorporated by reference herein in their entireties.

TECHNICAL FIELD

This document pertains generally, but not by way of limitation, to methods and apparatus for pest control.

BACKGROUND

A pest control device (e.g., mouse traps) may be used to control or eliminate the presence of a pest (e.g., a mouse) in a building (e.g., a home). The pest control device may need to be positioned in a space that is difficult to reach. For example, a mouse trap may need to be positioned in an attic space of a residential home to control (or eradicate) the population of mice in the attic space.

SUMMARY

The present inventors have recognized, among other things, that a problem to be solved may include controlling the presence of a pest (e.g., rodents, insects, or the like) in locations that are difficult to access (or otherwise position) a pest control device, such as to control the population of the pest in the difficult location. Additionally, the present inventors have recognized, among other things, that a problem to be solved may include controlling the presence of a pest in an area of a building that may be partially (or completely) inaccessible (e.g., an attic, behind a wall, underneath a floor, between a suspended ceiling and a roof of a building, or the like) from an occupied space (e.g., a finished portion of the building, an office, a warehouse, a manufacturing facility, a bedroom, or the like).

The present subject matter provides a solution to this problem, such as by a pest control device mounting system. The pest control device mounting system may include a pest control device mounting system may be configured for mounting pest control devices used in a building. The pest control device mounting system may include a mounting bracket that may have a circumferential portion. The circumferential portion may define a portal. The mounting bracket may have a flange portion suitable for attaching to the perimeter of a cavity in a building surface.

The pest control device mounting system may include a plug configured to be removably attached to the mounting bracket. The plug may substantially close the portal when attached to the mounting bracket. The plug may be installed into the mounting bracket to close the portal. The plug may be adapted to accommodate a pest control device.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4 illustrates yet another perspective view of the pest control device mounting system, in accordance with one embodiment of the present subject matter.

FIG. 5 illustrates an elongate member including a key, in accordance with one embodiment of the present subject matter.

DETAILED DESCRIPTION

Figure 1:
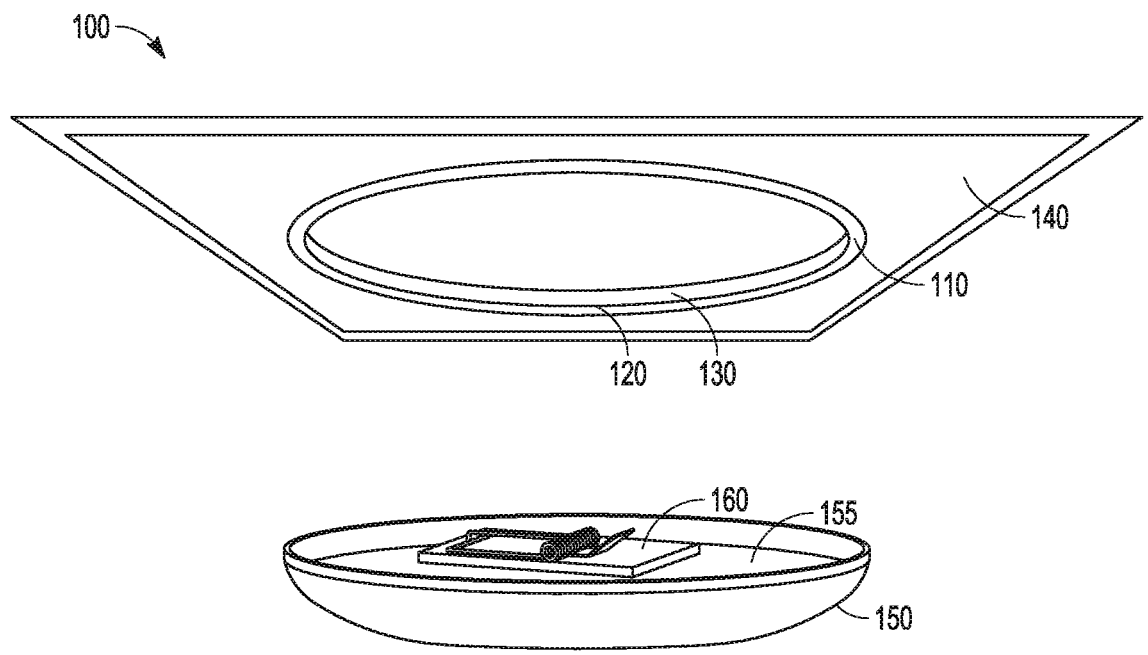
FIG. 1 illustrates a perspective view of a pest control device mounting system, in accordance with one embodiment of the present subject matter.

FIG. 1 illustrates a perspective view of a pest control device mounting system 100, in accordance with one embodiment of the present subject matter. The pest control device mounting system 100 is adapted to be used in a building. The building may include a single-family residence, a multi-family residence, a municipal building, an office building, a manufacturing facility, a hospital, a restaurant, a warehouse, or the like. The pest control device mounting system 100 includes a mounting bracket 110 and a plug 150, The mounting bracket 110 and the plug 150 may include, but is not limited to, a metal material, a plastic material (such as a polymer material), a rubber material, or combinations of two or more of these.

In various embodiments the mounting bracket 110 is coupled to a building surface 140. In various applications, the building surface 140 may include an interior surface of the building, including but not limited to a drop ceiling panel or tile, a wall, a ceiling, a floor, or the like. In various applications, the building surface 140 may include an exterior surface of the building, including but not limited to siding of the building or a roof of the building.

The mounting bracket 110 may include a circumferential portion 120 that defines a portal 130. The portal 130 provides ready access to an area of a building that may be partially (or completely) inaccessible (e.g., an attic, behind a wall, underneath a floor, between a suspended ceiling and a roof of a building, or the like) from an occupied space (e.g., a finished portion of the building, an office, a warehouse, a manufacturing facility, a bedroom, or the like). The portal 130 may provide access from a first side of the building surface 140 to a second side of the building surface 140. The portal 130 may extend through a thickness of the building surface 140.

As described in greater detail herein, the pest control device mounting system 100 includes the plug 150. The plug 150 is configured to be removably attached to the mounting bracket 110. The plug 150 may be installed into the mounting bracket 110. The plug 150 may substantially or entirely close the portal 130 when the plug 150 is attached to the mounting bracket 110.

The plug 150 is adapted to accommodate a pest control device 160. The pest control device 160 is adapted to control (e.g., contain, lure, or eliminate) the presence of a pest (e.g., a rodent, an insect, a mammal, a reptile, a bird) in a building or other space. The pest control device 160 could be used to lure and catch, trap, poison, electrocute, or otherwise control pests. In various embodiments, the pest control device 160 includes but is not limited to one or a more of or a combination of a mechanical trap (such as a snap trap), a glue trap, a live trap, an electrical trap, bait (e.g., peanut butter or the like), poison, a camera, an infrared sensor, and or a motion detector. In various applications an acoustical, electrical, and/or wireless detection device may be used in conjunction with the pest control device to perform one or more or combinations of triggering, resetting, monitoring, and annunciating trap operations and conditions (e.g., pest capture signals).

In various embodiments, the plug 150 includes a planar surface 155. The planar surface 155 may be adapted to hold, receive, or otherwise accommodate the pest control device 160. The pest control device 160 may be positioned on the planar surface 155. The planar surface 155 may be included in a detachable tray, and the detachable tray may be separable from the plug 150. In an example, a snap trap is coupled to the planar surface 155 and a rodent engages the snap trap. The engagement of the snap trap may eliminate (e.g., live catch, kill or immobilize) the rodent. The engagement of the snap trap may cause the planar surface 155 (or other portions) of the plug 150 to become contaminated (e.g., bodily fluids from the rodent may be released as a result of the engagement of the snap trap with the rodent). The detachable tray (and/or the pest control device 160) may be discarded and a replacement detachable tray may be attached to the plug 150, such as to remove the eliminated pest or remove contamination from the pest control device mounting system 100.

Figure 2:
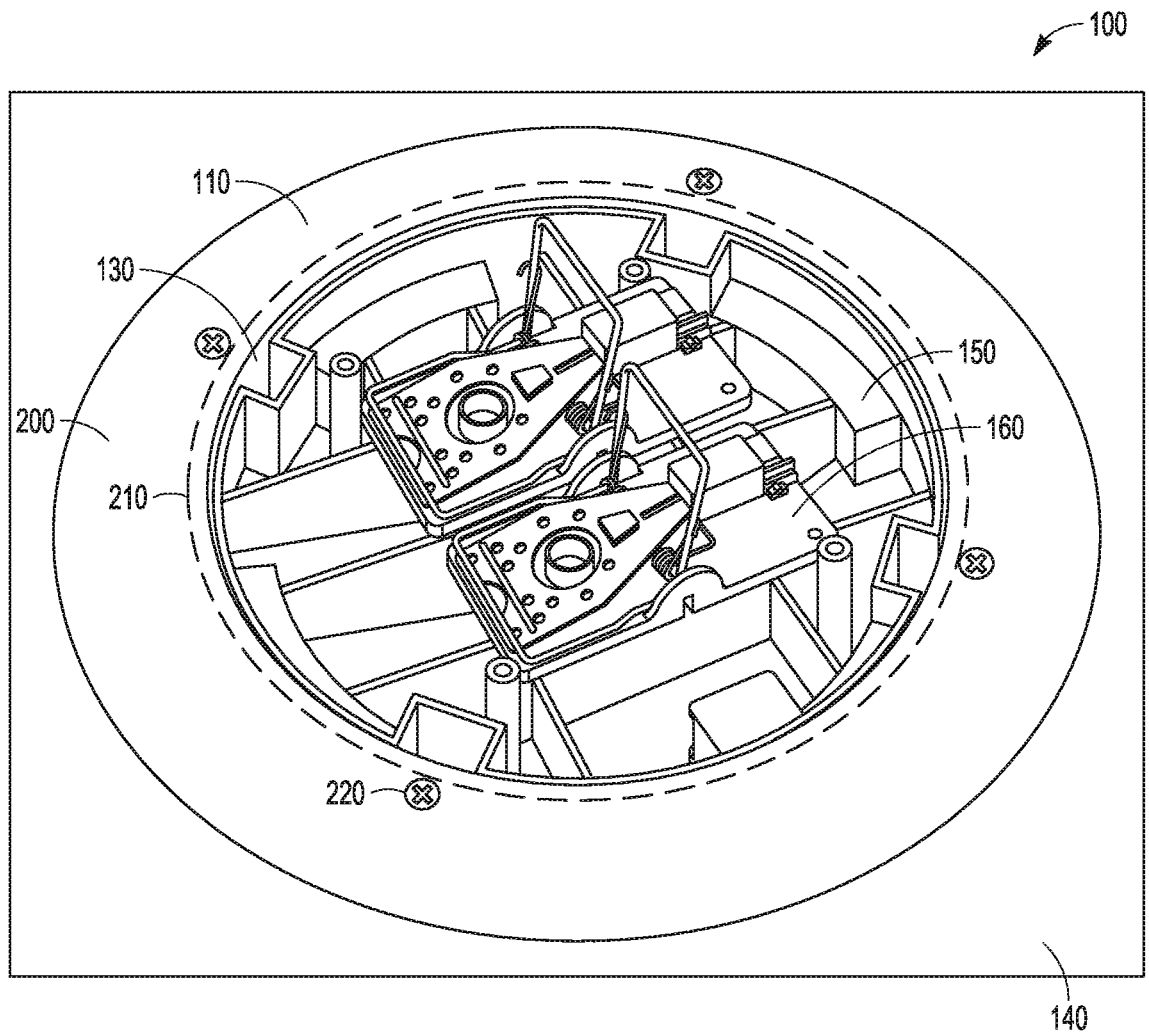
FIG. 2 illustrates another perspective view of the pest control device mounting system, in accordance with one embodiment of the present subject matter.

FIG. 2 illustrates another perspective view of the pest control device mounting system 100, in accordance with one embodiment of the present subject matter. In various embodiments, the mounting bracket 110 includes a flange 200. In some examples, the flange 200 is suitable for attaching the mounting bracket 110 to a perimeter of a cavity 210 in the building surface 140. The pest control device mounting system 100 may include a cutter adapted to create the cavity 210 in the building surface 140.

In an example, the mounting bracket 110 is positioned in the cavity 210 of the building surface 140, and the flange 200 is mated with (e.g., covers, overlaps, or the like) the perimeter of the cavity 210. The flange 200 may define a through-hole that is adapted to receive a fastener 220 (e.g., a screw, nail, rivet, or other connector). The fastener 200 may be positioned in the through-hole, and the fastener may be coupled to the building surface 140, and attaches the mounting bracket 110 to the building surface 140.

As described herein, the mounting bracket 110 includes the portal 130. The plug 150 may be installed into the mounting bracket 110. For example, and as shown in FIG. 2, the plug 150 may be positioned in the portal 130, and the plug 150 may substantially close the portal 130, Other variations of plug designs may offer features such as screen or holes for ventilation, windows to observe activity or a visual annunciator or signal.

The pest control device 160 may be attached to the plug 150, and the pest control device 160 may be positioned proximate a face of the building surface 160. In some applications, positioning the pest control device 160 proximate a face of the building surface 160 improves the ability of the pest control device 160 to control a pest (e.g., catch a mouse). The pest may be more likely to engage with a pest control device 160 if the pest control device 160 is in a more accessible location. In an example, and as shown in FIG. 2, the pest control device 160 is attached to the plug 150, and the pest control device 160 is positioned proximate a surface (e.g., top surface) of the building surface 140 (e.g., a ceiling tile for a drop ceiling). In another example, the planar surface 155 (shown in FIG. 1) is flush with the flange 200, and the pest control device is attached to the planar surface 155. In some examples, the planar surface 155 may be at different levels with respect to the flange 200.

Figure 3:
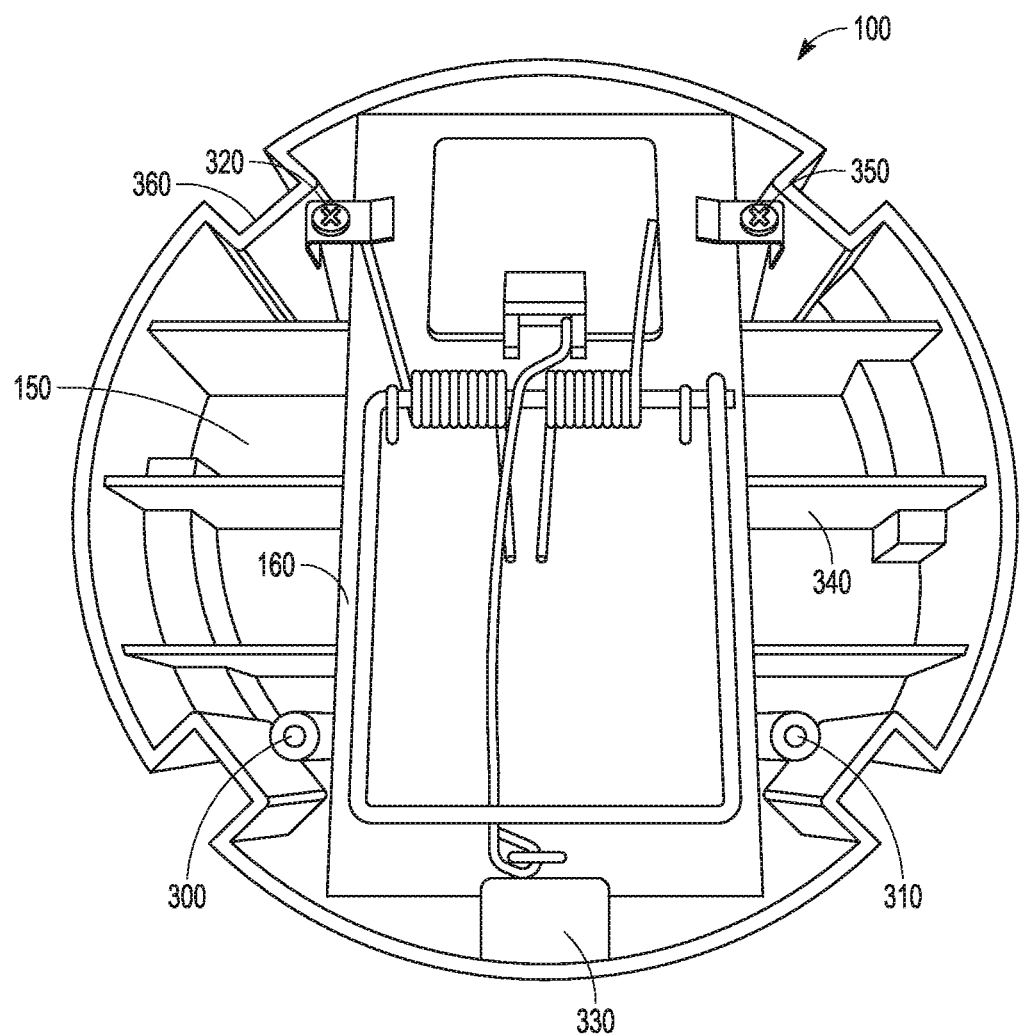
FIG. 3 illustrates a perspective view of a plug, in accordance with one embodiment of the present subject matter.

FIG. 3 illustrates a perspective view of the plug 150, in accordance with one embodiment of the present subject matter. The plug 150 may include a fixation feature 300. The fixation feature 300 helps attach the pest control device 160 to the plug 150. The fixation feature 300 may include an opening 310 for a fastener 320 to engage with the fixation feature 300. In various embodiments, the fastener 320 includes threads, and the fixation feature 300 includes threads suitable to engage with the threads of the fastener 320. A self-tapping screw or other connector may also be used to provide fixation to the fixation feature 300.

The plug 150 may include one or more tabs 330. In various embodiments, tab 330 is a fixation feature that helps secure the pest control device 160 to the plug 150. In various applications, the pest control device 160 is positioned proximate the plug 150. The pest control device may be positioned between the tab 330 and other portions of the plug 150, including (but not limited to) the planar surface 155 (shown in FIG. 1), structural support ribs 340, or the like. The tab 330 may help attach the pest control device 160 to the plug 150, for instance, by engaging with (e.g., retaining) a portion of the pest control device 160.

In various embodiments, the plug 150 includes one or more tabs 330 including a lip to engage with a portion of the pest control device 160. The tab 330 may deflect (e.g., bend or yield) in response to an applied force. In some embodiments, the tab 330 includes a ramp portion and the lip. The pest control device 160 may be positioned against the tab 330, and a force may be applied to the pest control device 160. The tab 330 may deflect (e.g., through engagement of the pest control device 160 with the ramp portion of the tab 330), and the pest control device 160 may lock into (e.g., snap into) position and the lip portion of the tab 330 may engage with a portion of the pest control device 160 and the tab 330 may help attach the pest control device 160 to the plug 150.

The pest control device mounting system 100 may include a retention clip 350 that may help attach the pest control device 160 to the plug 150. In an example, the retention clip 150 includes a through-hole, and the retention clip 350 is fastened to the plug (e.g., with the fastener 320 engaging with the fastening feature 300). The retention clip 350 may be sized and shaped to engage with the pest control device 160. In some examples, the retention clip 350 spans from the fixation feature 300 and engages with the pest control device 160.

As described in greater detail herein, the plug 150 may include plug coupling features. The plug coupling features may help attach the plug 150 to the mounting bracket 110. The plug 150 may define the plug coupling features. For instance, the plug coupling features may include a slot 360, and the slot 360 may be defined in a wall (or body) of the plug 150. The slot 360 may receive bracket coupling features (e.g., the pin 700 shown in FIG. 7), and the engagement of the plug coupling features with the bracket coupling features help attach the plug 150 to the mounting bracket 110.

FIG. 4 illustrates yet another perspective view of the pest control device mounting system 100, in accordance with one embodiment of the present subject matter. The pest control device mounting system 100 may include an elongate member 400. The elongate member 400 may help a user 410 to use, or otherwise service, the pest control device mounting system 100.

For example, the user 410 may stand on the floor of a building. The mounting bracket 110 and the plug 150 may be attached to the building panel 140 (e.g., a ceiling tile for a drop ceiling). The user 410 may desire to examine the plug 150 (e.g., uninstall the plug 150 from the mounting bracket 110) to determine if the pest control device 160 has engaged with a pest. The user 410 may be unable to reach the plug 150 (or the mounting bracket 110) in order to detach the plug 150 from the mounting bracket 110. The user 410 may utilize the elongate member 400 to attach (or detach) the plug 150 to (or from) the mounting bracket 110, In contrast, the user 410 may require assistance (e.g., a ladder, a chair, or the like) to attach and detach the plug to and from the mounting bracket 110 if the elongate member 400 is not utilized.

FIG. 5 illustrates the elongate member 400 including a key 500, in accordance with one embodiment of the present subject matter. The elongate member 400 may include an elongate body 510 that may be adapted to have a variable height (e.g., telescope). A handle 520 may be positioned on a first end of the elongate body 510, and the key 500 may be positioned on a second end of the elongate body. The key 500 may be a hand-tool and utilized without the elongate member 400.

As described in greater detail herein, the key 500 may engage with the plug 150, and the key 500 may help removably attach the plug 150 to the mounting bracket 110. The plug 150 may receive the key 500 (e.g., the key 500 may be received in the keyway 600 shown in FIG. 6), and the key 500 may be manipulated (e.g., rotated) to correspondingly manipulate the plug 150.

The elongate member 400 may be utilized as a multi-purpose tool. For example, the elongate member 400 may help the user 410 (shown in FIG. 4) reach (or otherwise engage, position, or manipulate) a pest control device e.g., the pest control device 160) that is located in an area that is difficult for the user 410 to reach (e.g., behind a refrigerator, or on a ledge in a crawlspace of a building). The elongate member 400 may help the user position the pest control device or inspect the pest control device.

Figure 6:
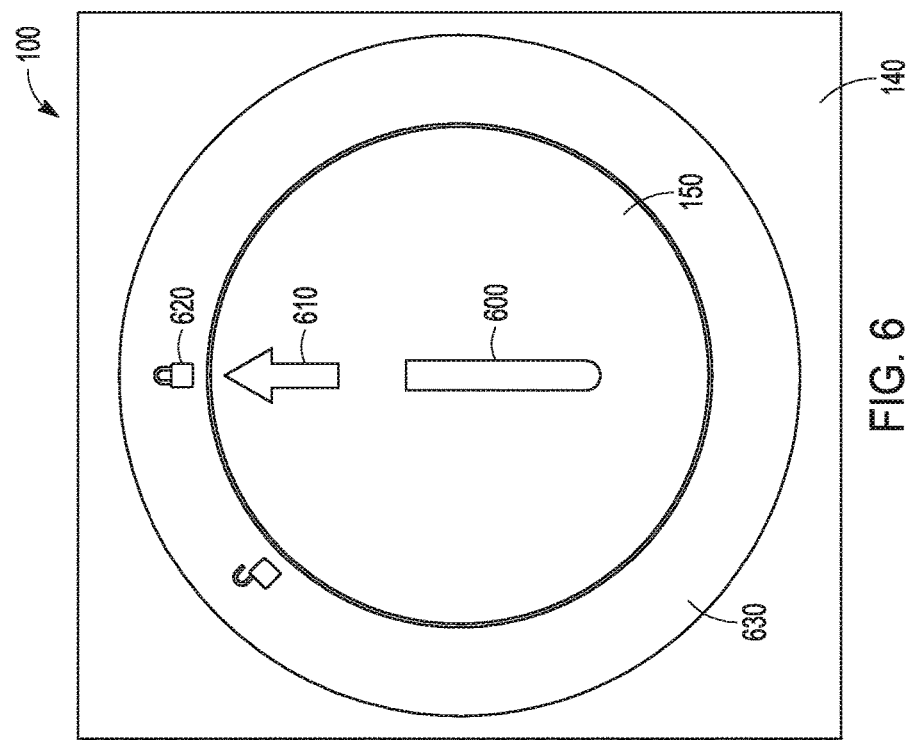
FIG. 6 illustrates still yet another perspective view of the pest control device mounting system, in accordance with one embodiment of the present subject matter.

FIG. 6 illustrates still yet another perspective view of the pest control device mounting system, in accordance with one embodiment of the present subject matter. The plug 150 may include a keyway 600. The keyway 600 may be adapted to (e.g., sized and shaped to) receive the key 500 (shown in FIG. 5). The key 500 may be positioned (e.g., received into) the keyway 600, and the key 500 may be manipulated to correspondingly manipulate the plug 150 with respect to the mounting bracket 110. It is understood that in various embodiments the keyway does not extend as a through hole in the plug 150 so as to substantially seal the portal for various reasons, such as health, sound, and cleanliness.

In various embodiments, pest control device mounting system 100 may include a locked configuration and an unlocked configuration. In the locked configuration, the plug 150 is installed in the mounting bracket 110 and attached to the mounting bracket 110 (e.g., through engagement of bracket coupling features and plug coupling features). In the unlocked configuration, the plug 150 may be allowed to separate from (e.g., be uninstalled from) the mounting bracket 110 (e.g., removed from the portal 130). The plug 150 may include plug indicia 310 adapted to indicate whether the pest control device mounting system 100 is in the locked configuration or the unlocked configuration. For example, the plug indicia 610 may be aligned with bracket indicia 620 to indicate whether the pest control device mounting system 100 is in the locked configuration or the unlocked configuration.

The pest control device mounting system 100 may include a cover 630. The cover 630 may attach to the mounting bracket 110. The building surface 140 may be positioned between (e.g., pressed between, sandwiched between, interfacing with, or the like) the mounting bracket 110 (e.g., the flange 200 shown in FIG. 2) and the cover 630. For example, the perimeter of the cavity 210 may be positioned between the cover 630 and the mounting bracket 110.

The cover 630 may help improve the aesthetic appearance of the pest control device mounting system 100. The cover 630 may obscure the perimeter of the cavity 210 (shown in FIG. 2) in the building surface 140, and may thereby improve the aesthetic appearance of the pest control device mounting system 100 that is attached to the building surface (e.g., by obscuring ragged edges of the cavity 210). A seamless (or nearly seamless) transition may be located at the interface of a face of the plug 150 and a face of the cover 630.

The pest control device mounting system 100 may include an indicator that may be adapted to notify (e.g., an occupant of a building) that the pest control device 160 (shown in FIG. 1) has been engaged (e.g., a snap trap has caught a rodent). The indicator may be included in the mounting bracket 110, the plug 150, or the cover 630. The indicator may be in electrical communication with a sensor, and the sensor may be adapted to sense when the pest control device 160 has been engaged. The indicator may include a visual indicator (e.g., a flag or a light), sound (e.g., tone or beep or buzz), an electrical signal transmitted to a remote monitoring system, a wireless signal, or other indicator or annunciator.

Figure 7:
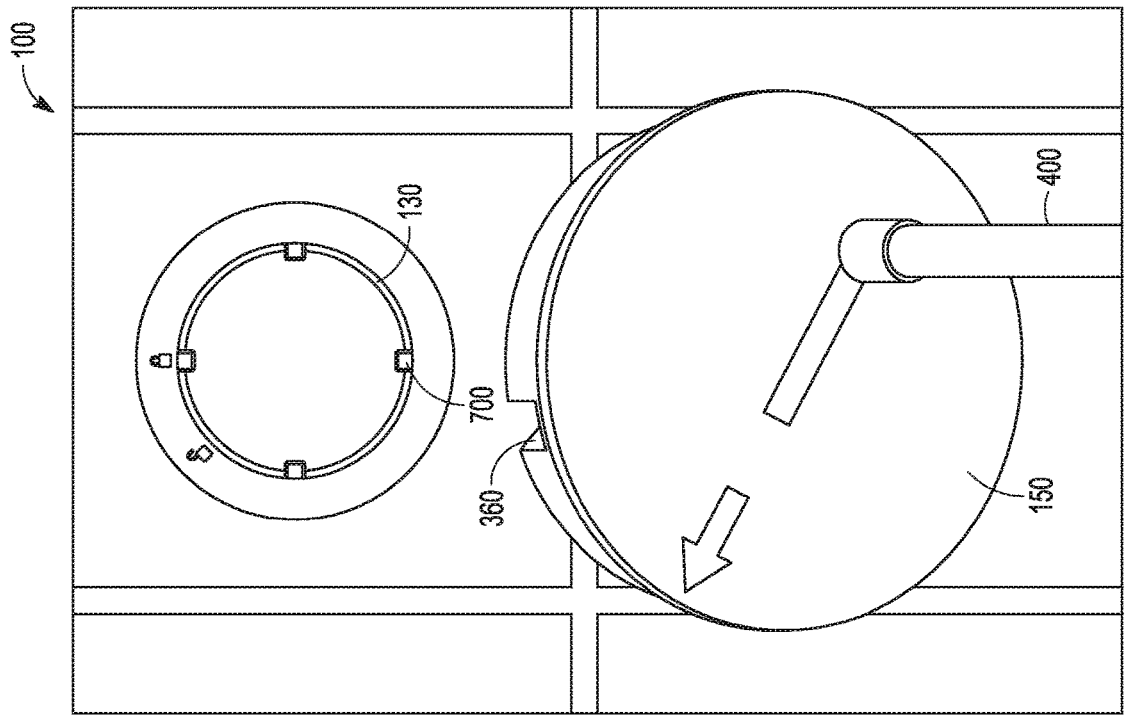
FIG. 7 illustrates a further perspective view of the pest control device mounting system, in accordance with one embodiment of the present subject matter.

FIG. 7 illustrates a further perspective view of the pest control device mounting system 100, in accordance with one embodiment of the present subject matter. As described herein, the plug 150 is detachably attachable to the mounting bracket 110. For instance, the plug 150 may include (or define) plug coupling features, including (but not limited to) the slot 360. The mounting bracket 110 may include bracket coupling features, including (hut not limited to) the pin 700. The bracket coupling features may be included in (or defined in) the portal 130. For example, the pin 700 may be positioned in the portal 130. The pin 700 may extend radially from the circumferential portion 120 (shown in FIG. 1) toward a center of the portal 130.

The plug coupling features may correspond with the bracket coupling features, for instance, to attach (or detach) the plug 150 to (or from) the mounting bracket 110. In an example, the slot 360 is adapted to receive the pin 700. The slot 360 may include a first portion of the slot 360. The slot 360 may include a second portion of the slot 360. The first portion of the slot 360 is in communication with (e.g., extends into) the second portion of the slot 360. In an example, the slot 360 is L-shaped, and the first portion of the slot 360 is substantially perpendicular to the second portion of the slot 360. Other configurations of the slot 350 are possible.

The plug 150 may be installed (e.g., inserted) into the portal 130, and the plug coupling features (e.g., the slot 360) may receive the bracket coupling features (e.g., the pin 700). As the plug 150 is installed, the bracket coupling features may translate within the plug coupling features (or vice-versa). The plug 150 may be manipulated (e.g., rotated) with respect to the mounting bracket 110, and the bracket coupling features may translate with respect to the plug coupling features. The engagement (or disengagement) of the plug coupling features (e.g., the slot 350) with the bracket coupling features (e.g., the pin 700) may attach (or detach) the plug 150 to (or from) the mounting bracket 110.

For example, in the locked configuration, the pin 700 may be positioned in the second portion of the slot 360. The pin 700 may engage with a wall of the second portion of the slot 360, and the engagement of the pin 700 with the second portion of the slot 360 may attach the plug 150 to the mounting bracket 110 (e.g., prevent the plug 150 from being detached from the mounting bracket 110). The plug 150 may be rotated with respect to the mounting bracket 110, and the pin 700 may enter the first portion of the slot 360. In the unlocked configuration the pin 700 may, be positioned in the first portion of the slot 360, and the plug 150 may be detachable from the mounting bracket 110.

Figure 8:
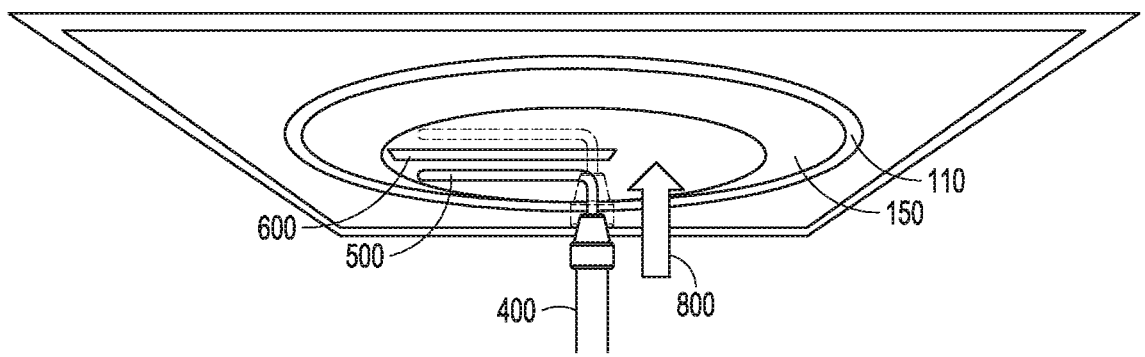
FIG. 8 illustrates another perspective view of the pest control device mounting system, in accordance with one embodiment of the present subject matter.

FIG. 8 illustrates another perspective view of the pest control device mounting system, in accordance with one embodiment of the present subject matter.

FIG. 8 shows the pest control device mounting system 100 in the locked configuration. As described herein, the pest control device mounting system 100 may include the elongate member 400. The elongate member 400 may be positioned proximate the plug 150, and the key 500 of the elongate member 400 may be inserted into (e.g., in the direction indicated by arrow 800) the keyway 600. The keyway 600 may receive the key 500.

Figure 9:
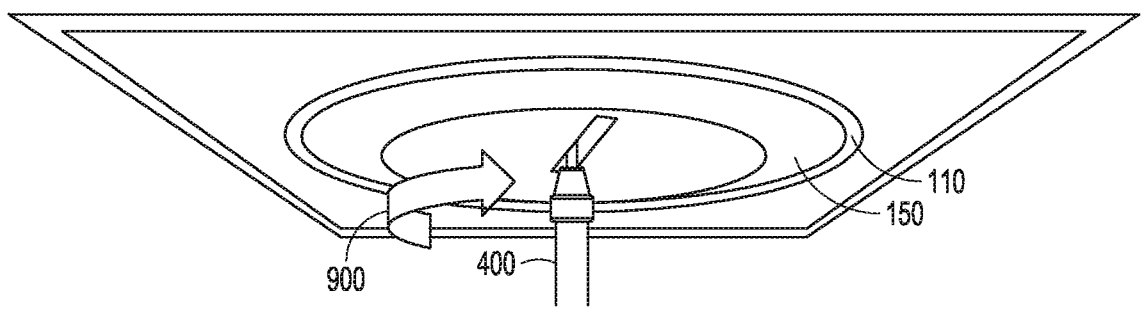
FIG. 9 illustrates yet another perspective view of the pest control device mounting system, in accordance with one embodiment of the present subject matter.

FIG. 9 illustrates yet another perspective view of the pest control device mounting system 100, in accordance with one embodiment of the present subject matter. As described herein, the plug 150 may be manipulated (e.g., rotated in the direction indicated by arrow 900) and the bracket coupling features (e.g., the pin 700 shown in FIG. 7) may engage (or disengage) with the mounting coupling features e.g., the slot 360 shown in FIGS. 3 and 7). The key 500 (shown in FIG. 8) may be manipulated (e.g., rotated) to correspondingly manipulate the plug 150. The plug 110 may rotate with respect to the mounting bracket 110, and the pest control device mounting system 100 may be in the unlocked configuration.

Figure 10:
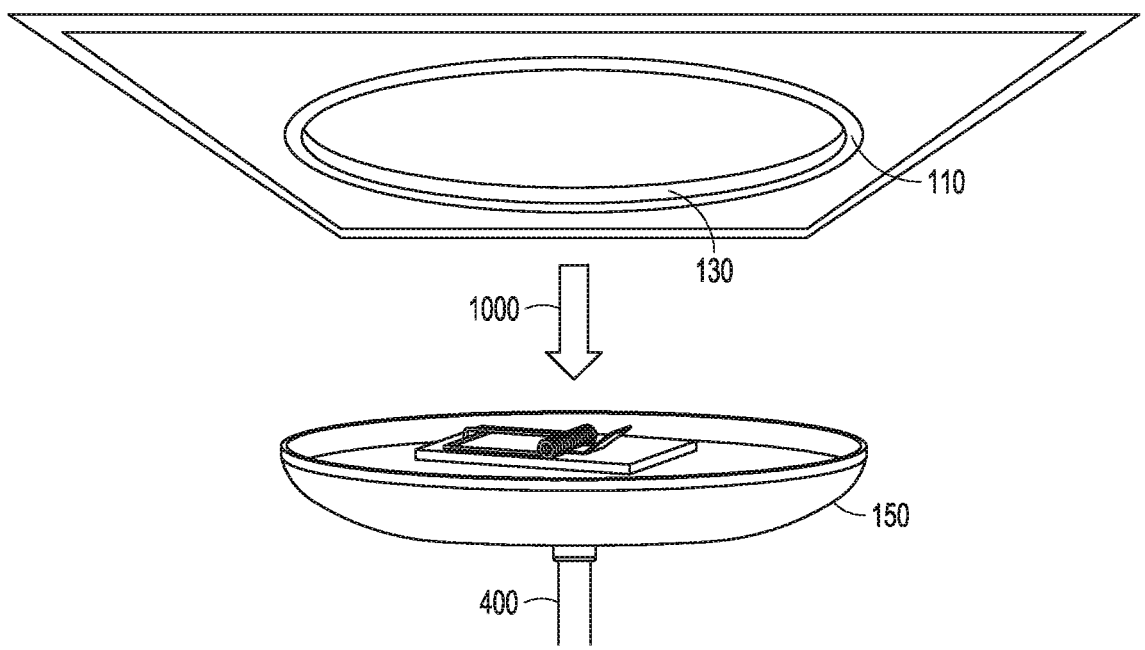
FIG. 10 illustrates still yet another perspective view of the pest control device mounting system, in accordance with one embodiment of the present subject matter.

FIG. 10 illustrates still yet another perspective view of the pest control device mounting system 100, in accordance with one embodiment of the present subject matter. The plug 150 may be detached from the mounting bracket 110, for example, when the pest control device mounting system 100 is in the unlocked configuration. The plug 150 may be separated from the mounting bracket 110 and may be repositioned (e.g., lowered, for instance in the direction of arrow 1000).

The positioning of the key 500 (shown in FIG. 8) in the keyway 600 (shown in FIG. 8) may help detach the plug 150 from the mounting bracket 110. For instance, the key 500 may be received by the keyway 600. The key 500 may be retained in the keyway 600 when the plug 150 is detached from the mounting bracket 110. The elongate member 400 may support (e.g., suspend) the plug 150, and help a user (e.g., the user 410 shown in FIG. 4) install (or uninstall) the plug from the mounting bracket 110 (e.g., inserting the plug 150 into the portal 130).

Figure 11:
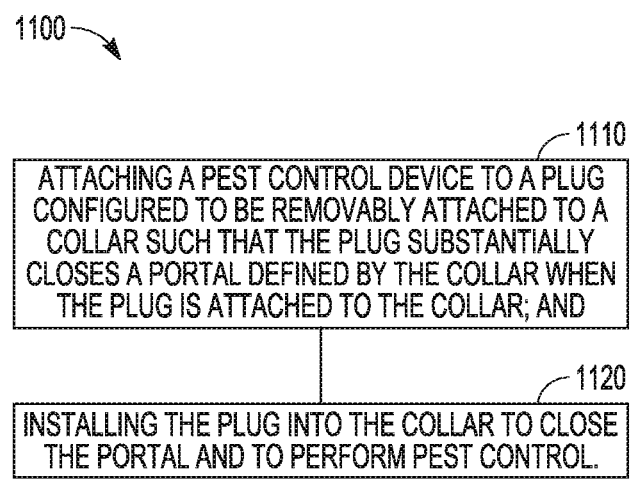
FIG. 11 illustrates one embodiment of a pest control method, including one or more of the pest control device mounting system, in accordance with one embodiment of the present subject matter.

FIG. 11 illustrates one embodiment of a pest control method 1100, including one or more of the pest control device mounting system 100.

At 1110, a pest control device is attached to a plug 150. The plug 150 may be removably attached to a mounting bracket 110. The mounting bracket 110 may mount in a hole (e.g., the cavity 210 shown in FIG. 2) a wall or other surface (e.g., the building surface 140). The plug 150 may substantially close a portal 130 defined by the mounting bracket 110. The plug 150 may substantially close the portal 130 when the plug 150 is attached to the mounting bracket 110.

At 1120, the plug is installed into the mounting bracket 110 to close the portal 130. The method 1100 may include that installing the plug 150 includes rotating the plug 150 with respect to the mounting bracket 110. The method 1100 may include positioning a key 500 in a keyway 600 of the plug 150. The method 110 may include manipulating the key 500 to removably attach the plug 150 with the mounting bracket 110. The method 1100 may include manipulating the key 500 to removably detach the plug 150 from the mounting bracket 110. The method 1100 may include attaching the plug 150 with an elongate member 400. The method 1100 may include raising or lowering the plug 150 to install the plug into the mounting bracket 110 (e.g., with the elongate member 400).

In describing the method 1100, reference is made to one or more components, features, functions and operations previously described herein. Where convenient, reference is made to the components, features, operations and the like with reference numerals. The reference numerals provided are exemplary and are not exclusive. For instance, components, features, functions, operations and the like described in the method 1100 include, but are not limited to, the corresponding numbered elements provided herein and other corresponding elements described herein (both numbered and unnumbered) as well as their equivalents.

Figure 12:
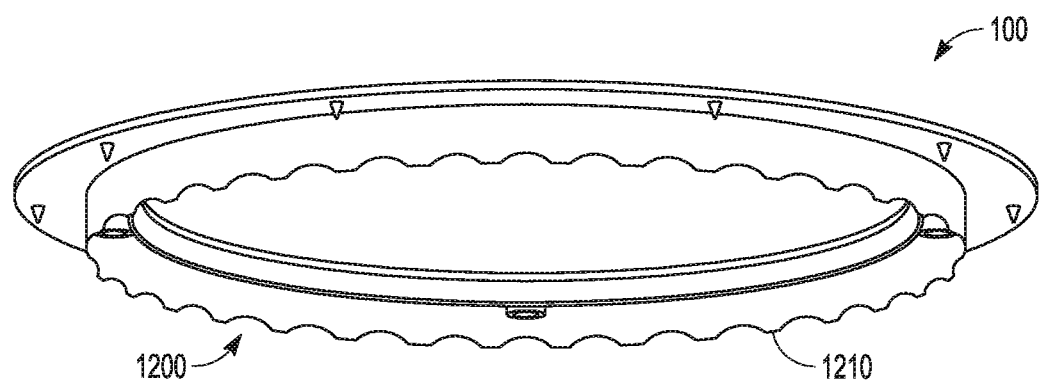
FIG. 12 illustrates a perspective view of another example of the pest control device mounting system, in accordance with one embodiment of the present subject matter.

FIG. 12 illustrates a perspective view of another example of the system 100. As described herein, the pest control device mounting system 100 may be adapted to create the cavity 210 (e.g., as shown in FIG. 2) in the building surface 140. For example, the system 100 may include a cutter 1200. Operation of the cutter 1200 may create the cavity 210 in the building surface 140. In various embodiments, a user may rotate the cutter 1200 and mechanically remove a portion of the building surface 140. For example, the mounting bracket 110 may define a serrated edge 1210, and the serrated edge 1210 may be sized and shaped to mechanically remove material from the building surface 140. Other cutting apparatus and methods may be used without departing from the scope of the present subject matter. For example, the cutter 1200 may score a line in the building surface 140, and a tool may be used to cut along the scored line to create the cavity 210.

Figure 13A:
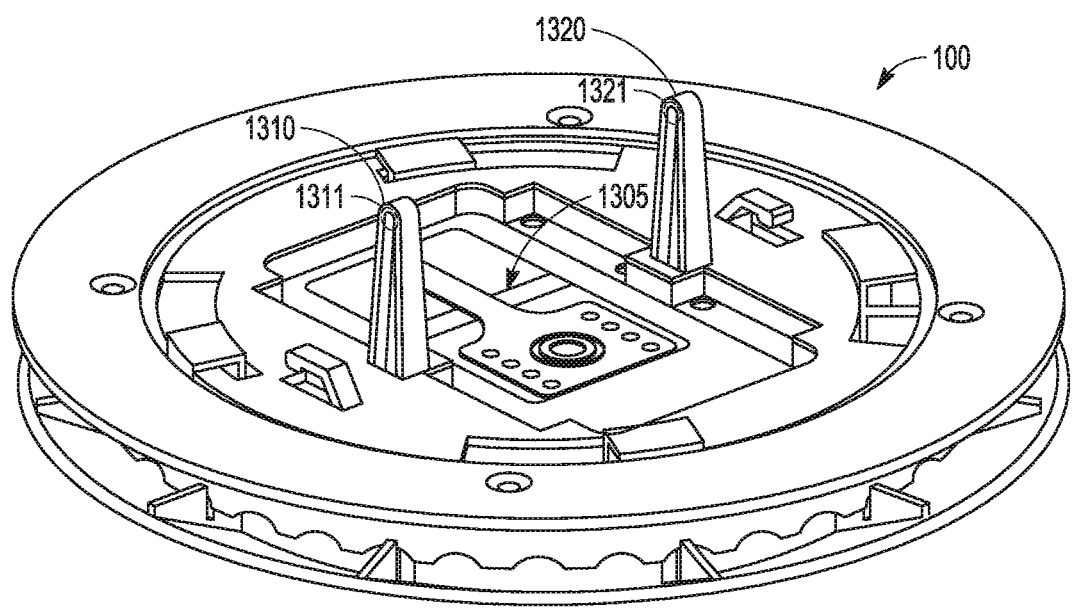
FIG. 13A-13C illustrate additional perspective views of the system of FIG. 12, in accordance with various embodiments of the present subject matter.
Figure 13B:
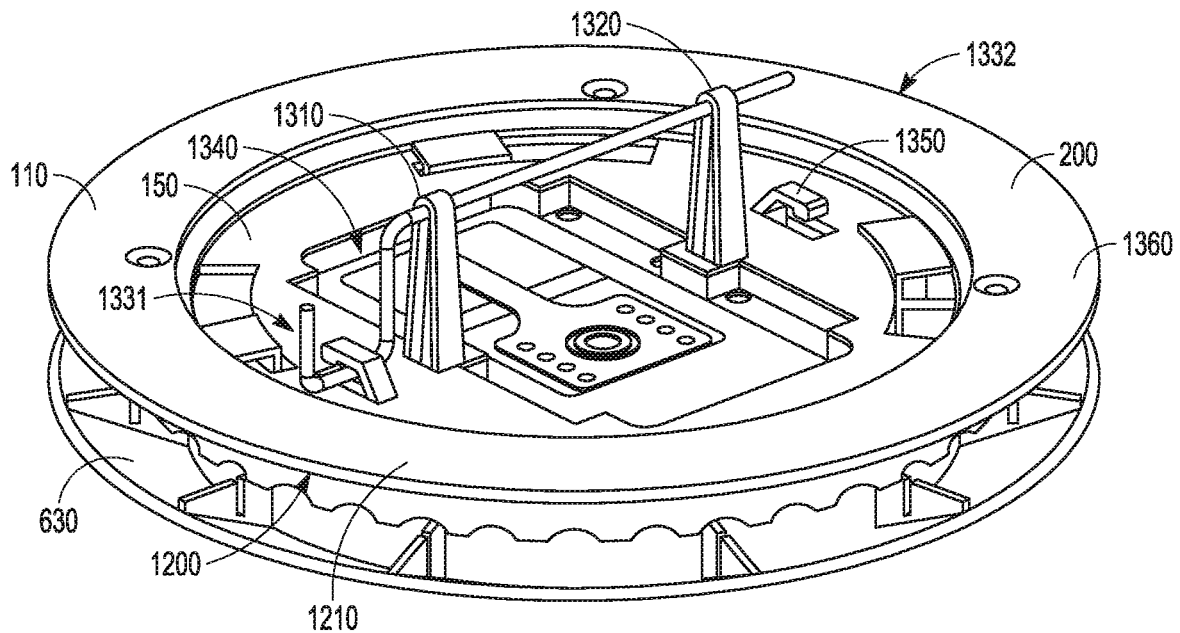
Figure 13C:
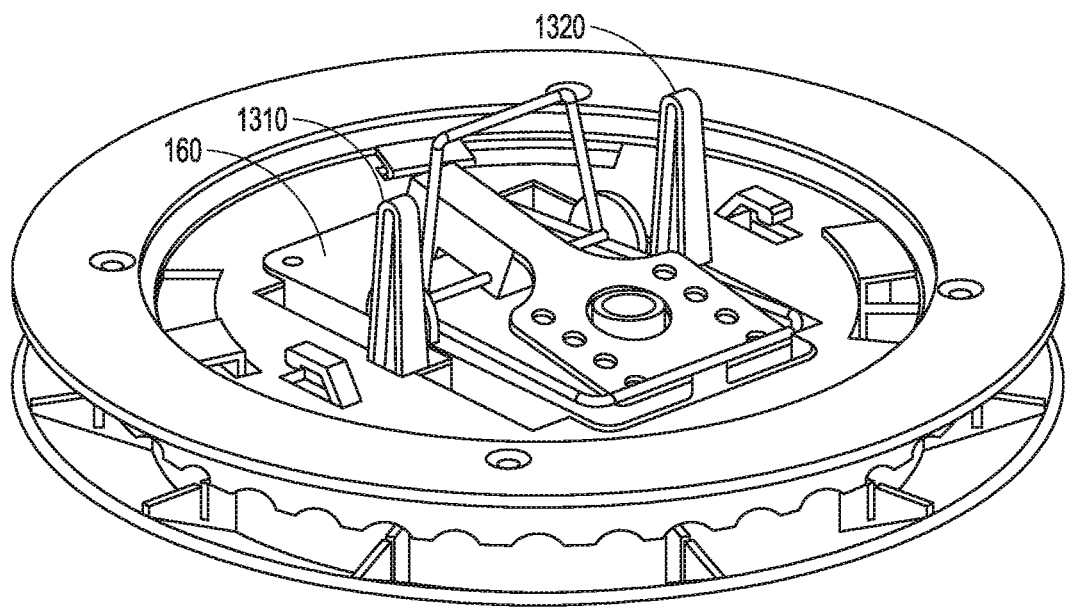

FIG. 13A-13C illustrate additional perspective views of the system 100 of FIG. 12. The mounting bracket 110 may include the cutter 1200. For example, the mounting bracket 110 may define the serrated edge 1210. Accordingly, the cutter 1200 may facilitate installation of the mounting bracket 110 (and the system 100) in the building surface 140 (e.g., as shown in FIG. 1). For instance, inclusion of the cutter 1200 in the mounting bracket 110 may reduce the amount of tools necessary to install the system 100. The mounting bracket 110 may be located in a desired position by a user, and the cutter 1200 may be operated (e.g., twisted, oscillated, moved, or the like) to mechanically remove a portion of the building surface 140, for example to define the cavity 210 (e.g., as shown in FIG. 2). Accordingly, the mounting bracket 110 may be installed without requiring the use of an additional tool (e.g., a saw, or the like).

The pest control device mounting system 100 may include a bait support system 1300. For example, the bait support system 1300 may include a first post 1310 and a second post 1320. The posts 1310, 1320 may project from the plug 150 (e.g., the planar surface 155, shown in FIG. 1). The bait support system 1300 may include a bait rod 1330 that may be sized and shaped to couple with a piece of bait (e.g., a block of rodenticide, including, but not limited to, bromadiolone or the like) or a plurality of pieces of bait. For instance, the bait rod 1330 may be inserted through the bait and provide support to the bait.

The bait rod 1330 may engage with the posts 1310, 1320 to secure the bait to the plug 150. For example, the bait rod 1330 may include a first end 1331 and a second end 1332. The second end 1332 can be inserted into the posts 1310, 1320. For instance, a portion of the bait rod 1330 may be received by an aperture 1311 defined by the post 1310. Although FIG. 13B shows the second end 1332 extending through the post 1320, the present subject matter is not so limited. For instance, the post 1320 may capture the second end 1332 within a receptacle 1321. The posts 1310, 1320 may elevate the bait with respect to the plug 150.

The pest control device mounting system 100 may include a pest control area 1305. The pest control area 1305 may be located between the posts 1310, 1320. The bait may be located in the pest control area 1305. The pest control device 160 may be located in the pest control area 1305. The pest control area 1305 may be located above the keyway 600 (e.g., as shown in FIG. 6), for example the pest control area can be centered over the keyway 600. Locating the pest control area 1305 above the keyway 600 may help evenly distribute a load applied to the plug 150. For example, a pest (e.g., rodent) can be captured by the pest control device 160. A user may detach the plug 150 from the mounting bracket 110, for instance to remove the captured pest. Locating the pest control area 1305 above the keyway 600 may help maintain the plug 150 in a level orientation when the plug 150 is detached from the mounting bracket 110, for instance to prevent a captured pest from falling off the plug 150. The elongated member 400 (e.g., as shown in FIG. 7) may include a plate that may is located to engage with the plug 150 and help maintain the plug in a level orientation.

The bait rod 1330 may define a hook portion 1340, and the plug 150 may define a locking mechanism 1340. The hook portion 1340 may be located at the first end 1331 of the bait rod 1330. The hook portion 1340 may engage with the locking mechanism 1350 (e.g., clip, latch, detent, recess, or the like) to secure the bait rod 1330 to the plug 150. For example, the locking mechanism 1350 may be sized and shaped to receive the hook portion 1340 of the bait rod 1330, and the reception of the hook portion 1340 by the locking mechanism 1350 may inhibit the movement of the bait rod 1330 with respect to the plug 150 (and the posts 1310, 1320). Accordingly, the bait rod 1330 may be secured to the plug 150 to inhibit separation of the bait from the plug 150.

As described herein, the mounting bracket 110 may include a flange 200. The flange 200 may define a through hole 1360, and a fastener (e.g., the fastener 220, shown in FIG. 2) may be inserted into the through hole 1360. The fastener may engage with the cover 630 (shown in FIG. 3), and the fastener may facilitate coupling the cover 630 with the mounting bracket 110. The building surface 140 (shown in FIGS. 1 and 2) may be located between the flange 200 and the cover 630, and the coupling of the cover 630 with the mounting bracket 110 may secure the system 100 to the building surface 140. For example, the building surface 140 may be pressed (e.g., sandwiched, squeezed, or the like) between the flange 200 and the cover 630 to prevent the movement of the system 100 relative to the building surface 140.

Figure 14:
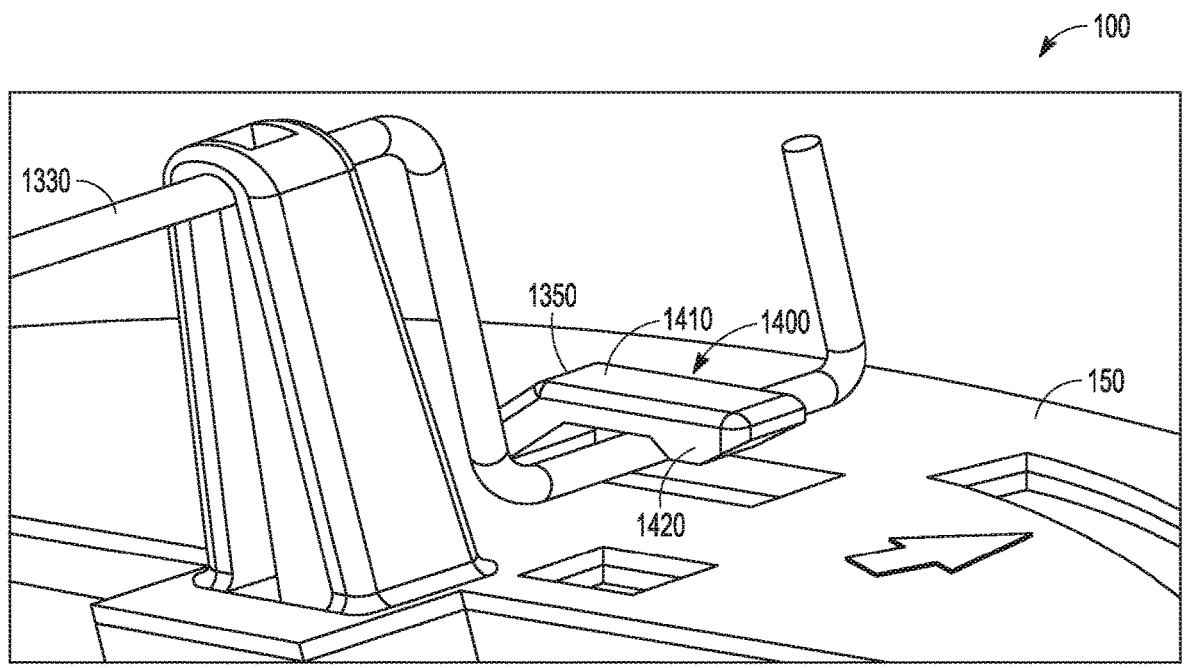
FIG. 14 is a detailed perspective view of the system of FIG. 12.
Figure 15A:
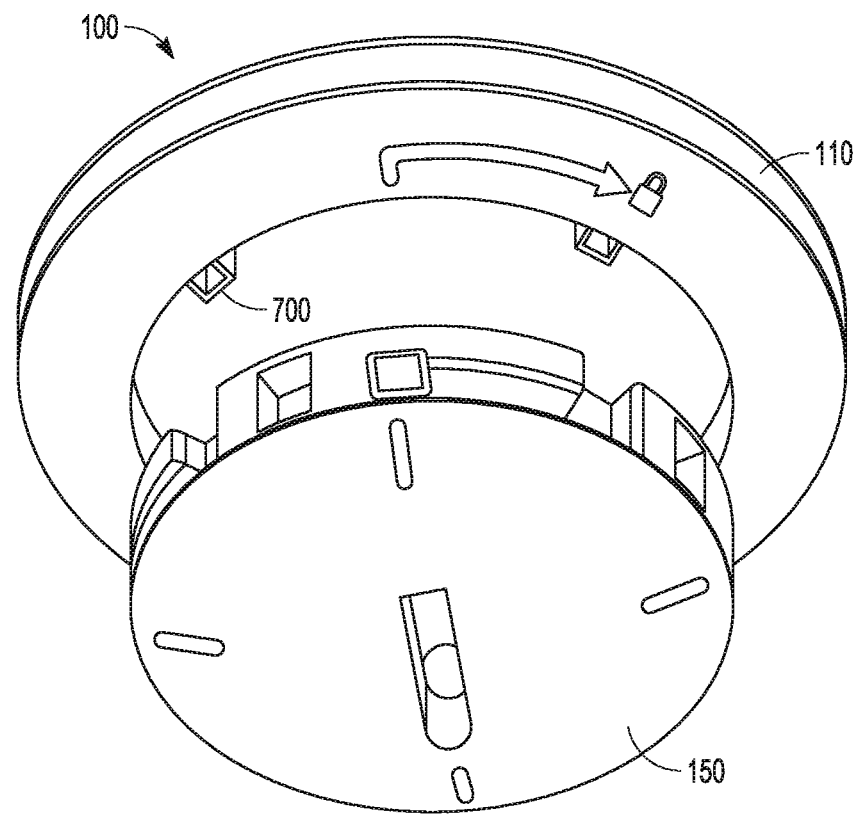
FIGS. 15A-D illustrate further perspective views of the system of FIG. 12.
Figure 15B:
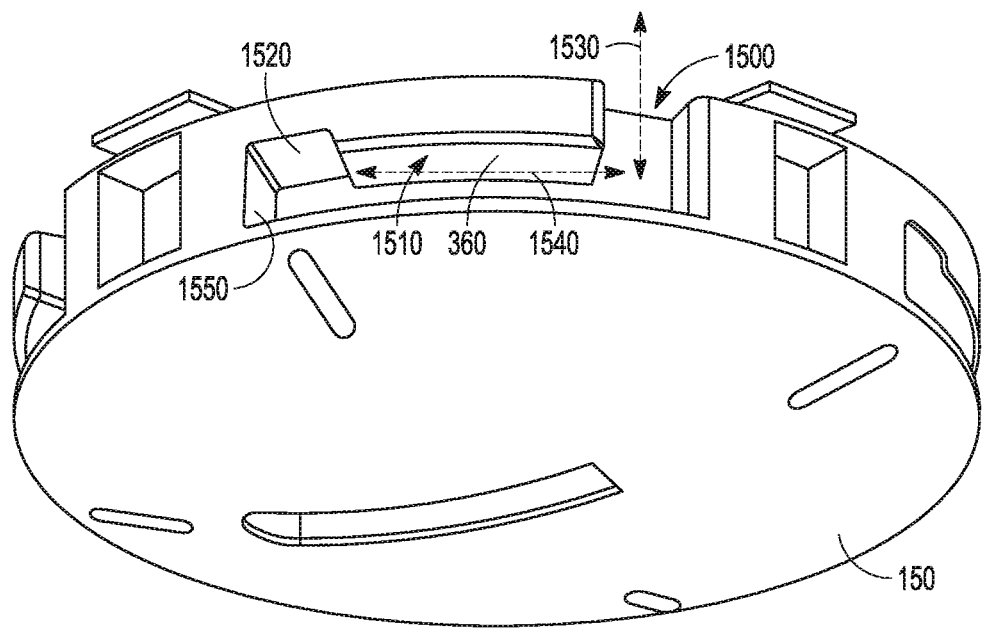
Figure 15C:
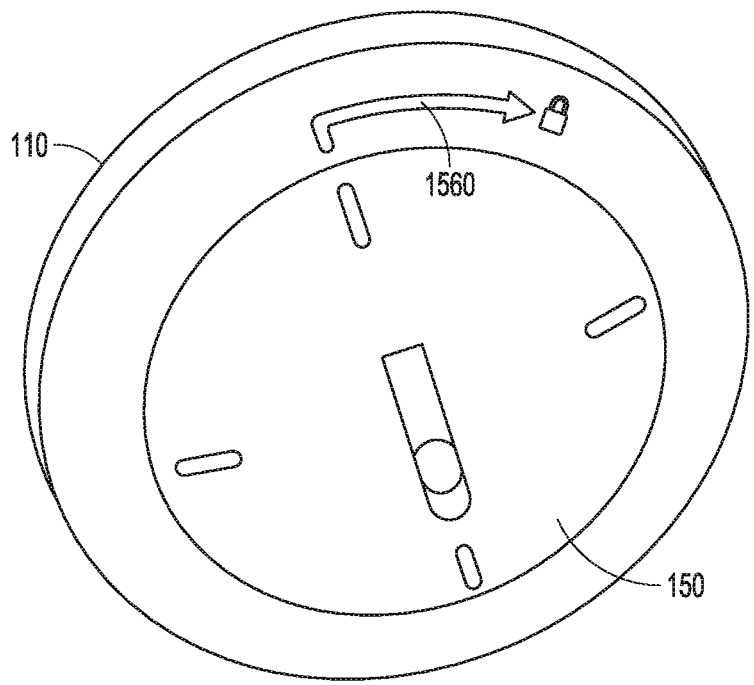
Figure 15D:
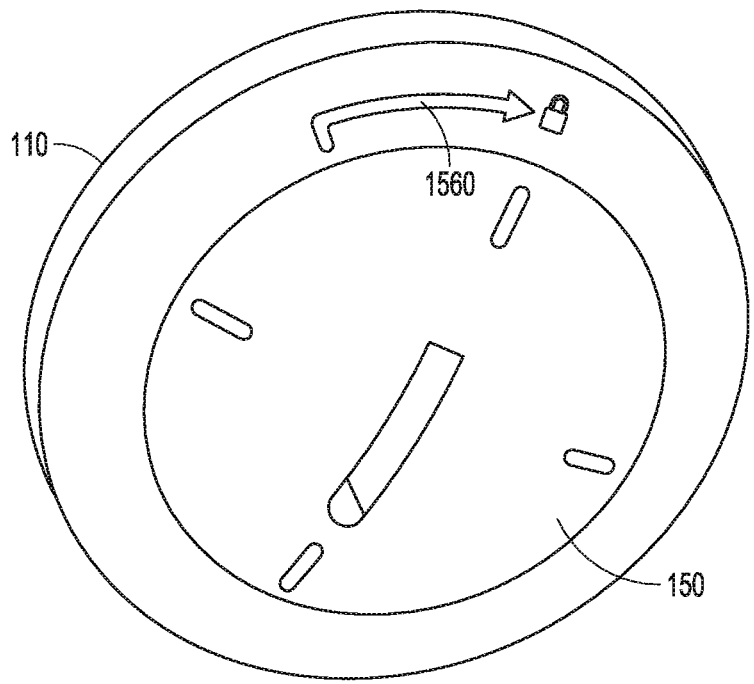
Figure 16:
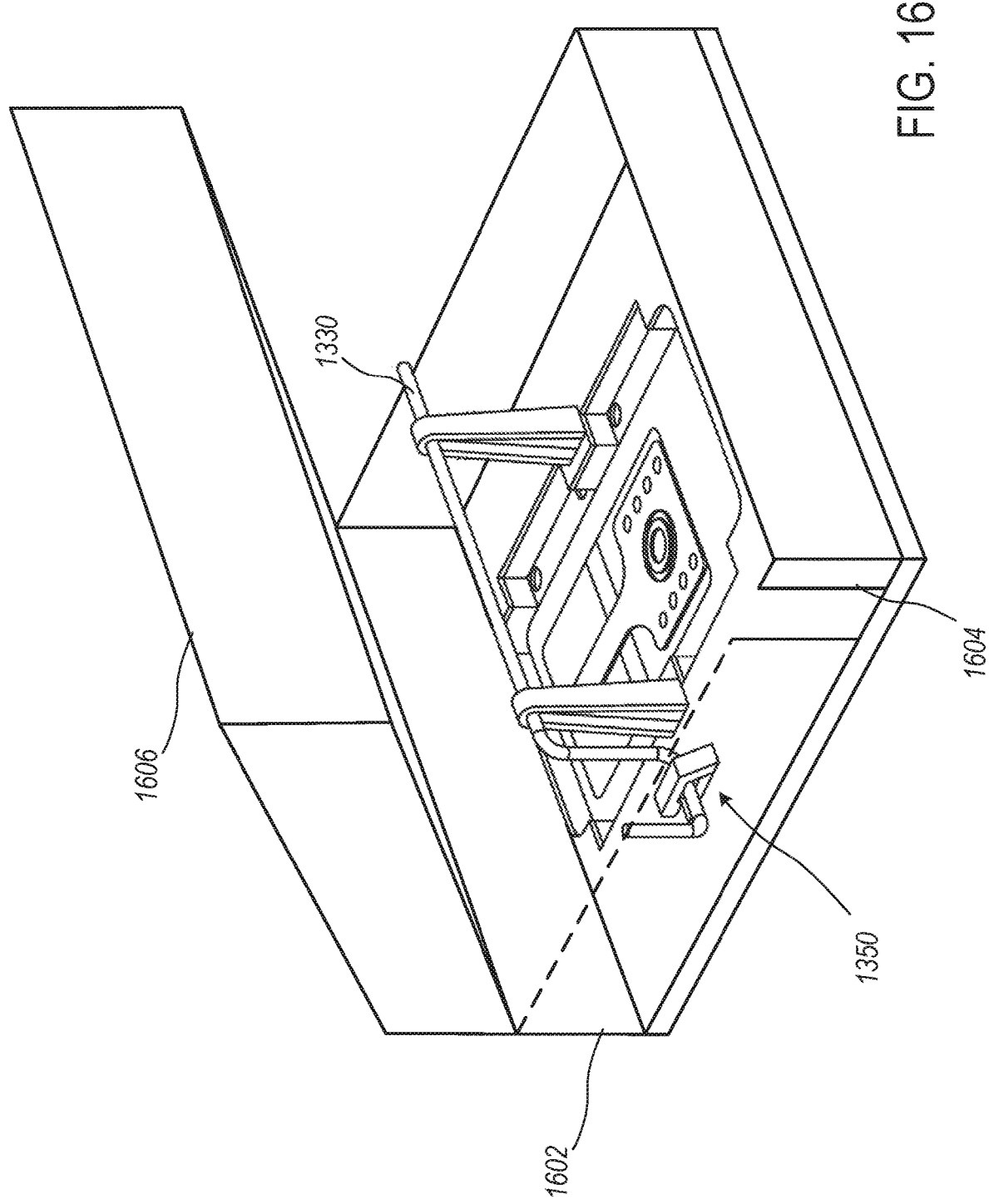
FIG. 16 is a detailed perspective view of the system of FIG. 13.

FIG. 14 is a detailed perspective view of the system 100 of FIG. 12. As described herein, the bait support system 1300 may include the bait rod 1330 that has the hook portion 1340, and a locking mechanism 1350. The locking mechanism 1350 may be sized and shaped to receive the hook portion 1340. For example, the locking mechanism 1350 may define a locking channel 1400 that may be sized and shaped to receive the hook portion 1340. The locking channel 1400 can be defined by a tab 1410 that projects from the plug 150, The reception of the hook portion 1340 within the locking channel 1400 may secure the bait rod 1330 to the plug 150, and may inhibit the movement (e.g., removal) of the bait rod 1330 with respect to the plug 150. Securing the bait rod 1330 to the plug 150 may inhibit the unintended separation of the bait from the plug 150 (e.g., if an animal interacts with the bait rod 1330 in an attempt to separate the bait from the plug 150). Accordingly, securing the bait rod 1330 to the plug 150 improves the performance of the system 1300 because the bait may remain available for additional pests to consume the bait.

In some examples, the locking mechanism 1350 may define a ridge 1420. The ridge 1420 may engage with the hook portion 1340 of the bait rod 1330 to inhibit movement of the hook portion 1340 out of the locking channel 1400. Accordingly, the ridge 1420 may help improve the coupling of the bait rod 1330 with the plug 150 by increasing the amount of force necessary to remove the bait rod 1330 from the locking channel 1400.

It is understood that the improved bait rod 1330 and locking mechanism 1350 may also be used in a variety of pest control devices other than system 100. For example, the bait rod 1330 may be located within a bait box 1602 (e.g., a box with an opening 1604 that facilitates the entry and exit of a pest). It may provide an improvement over bait box designs that require a lid configured to lock a bait bar, such as designs where the lid is opened to release the bait bar and closed to clamp down on the bait bar or secure it within the bait box. Such bait box designs are inferior because if the cover is separated from the remainder of the box, the bait may be separated from the bait box (e.g., by a pest or other animal that may carry the bait away from the bait box). The present locking mechanism 1350 secures a bait bar 1330 to the bait box to keep the bait securely in place until the bar is removed from the locking mechanism, even if the cover 1606 is open.

FIGS. 15A-D illustrate further perspective views of the system 100 of FIG. 12. As described herein, the system 100 may include a locked configuration and an unlocked configuration. In the unlocked configuration, the plug 150 may be detached from the mounting bracket 110. In the locked configuration, the plug 150 is attached to the mounting bracket 110.

For example, the plug 150 may define a slot 360, and the slot 360 may include a first portion 1500 and a second portion 1510. The mounting bracket 110 may include the pin 700. The first portion 1500 may be sized and shaped to receive the pin 700, for example the pin 700 may translate within the first portion 1500 along a first axis 1530, The pin 700 may enter or exit the slot 360 through the first portion 1500 of the slot 360. Accordingly, the plug 150 may be detached from the mounting bracket 110 when the pin 700 is located in the first portion 1500 of the slot 360.

The pin 700 may be received in the second portion 1510 of the slot 360, for example the pin 700 may translate within the second portion 1510 along a second axis 1540. The first axis 1530 may be angled with respect to the second axis 1540 (e.g., the first axis 1530 may be perpendicular to the second axis 1540). The reception of the pin 700 in the second portion 1500 may attach the plug 150 to the mounting bracket 110.

The plug 150 may define a pin recess 1520, and the pin recess 1520 may be located in the second portion 1510 of the slot 360. The pin recess 1520 may be sized and shaped to receive the pin 700, for example the pin 700 may translate within the pin recess 1520, for instance by translating parallel to the first axis 1530. The reception of the pin 700 within the pin recess 1520 may inhibit the movement of the plug 150 relative to the mounting bracket 110. For example, the reception of the pin 700 within the pin recess 1520 may inhibit the rotation of the plug 150 with respect to the mounting bracket 110 (e.g., translation along the second axis 1540). Accordingly, the reception of the pin 700 within the pin recess 1520 may facilitate maintaining the system 100 in the locked configuration.

For example, to transfer the system 100 from the locked configuration to the unlocked configuration, a user may translate (e.g., displace, push, or the like) the plug 150 along the first axis 1530 and disengage the pin 700 from the pin recess 1520. The user may then rotate the plug 150 with respect to the mounting bracket 110 (e.g., translate the pin 700 within the second portion 1510 along the second axis 1540). For instance, the user may rotate the plug 150 in a direction opposite to the direction indicated by arrow 1560. The rotation of the plug 150 may position the pin 700 in the first portion 1510 of the slot 360, and may facilitate detachment of the plug 150 from the mounting bracket 110.

The pin recess 1520 may be located proximate to an end wall 1550 of the slot 360. The end wall 1550 may engage with the pin 700 and may help prevent the over rotation of the plug 150 with respect to the mounting bracket 110. The end wall 1550 may help align the pin 700 with the pin recess 1520 to facilitate translating the pin 700 into the pin recess 1520.

Various Notes & Examples

Aspect 1 may include or use subject matter (such as an apparatus, a system, a device, a method, a means for performing acts, or a device readable medium including instructions that, when performed by the device, may cause the device to perform acts, or an article of manufacture), such as may include or use a pest control device mounting system. The pest control device mounting system may be utilized for mounting pest control devices used in a building.

The pest control device mounting system may include a mounting bracket having a circumferential portion. The circumferential portion may define a portal. The mounting bracket may have a flange portion. The flange portion may be suitable for attaching to the perimeter of a cavity in a building surface.

The pest control device mounting system may include a plug. The plug may be configured to be removably attached to the mounting bracket. The plug may substantially close the portal when attached to the mounting bracket. The plug may be further adapted to accommodate a pest control device.

Aspect 2 may include or use, or may optionally be combined with the subject matter of Aspect 1, to optionally include or use that the pest control device may be attached to the plug to perform pest control.

Aspect 3 may include or use, or may optionally be combined with the subject matter of Aspect 2 to optionally include or use that the pest control device may include a snap trap, a glue trap, a live trap, bait, a camera, an infrared sensor, or may include a motion detector.

Aspect 4 may include or use, or may optionally be combined with the subject matter of Aspect 2 to optionally include or use that the pest control device may be a first pest control device. The pest control device mounting system may include a second pest control device attached to the plug.

Aspect 5 may include or use, or may optionally be combined with the subject matter of one or any combination of Aspects 1 through 4 to optionally include or use a planar surface. The pest control device may be attached to the planar surface.

Aspect 6 may include or use, or may optionally be combined with the subject matter of one or any combination of Aspects 1 through 5 to optionally include or use that the pest control device may be positioned proximate a side of the building surface.

Aspect 7 may include or use, or may optionally be combined with the subject matter of one or any combination of Aspects 1 through 6 to optionally include or use that the building surface may include a ceiling, a wall, or a floor.

Aspect 8 may include or use, or may optionally be combined with the subject matter of one or any combination of Aspects 1 through 7 to optionally include or use bracket coupling features. The pest control device mounting system may include plug coupling features. The plug coupling features may correspond with the bracket coupling features to attach the plug to the mounting bracket.

Aspect 9 may include or use, or may optionally be combined with the subject matter of Aspect 8 to optionally include or use that the bracket coupling features may engage with the plug coupling features. The engagement of the bracket coupling features with the plug coupling features may attach the plug to the mounting bracket in a locked configuration. The bracket coupling features may disengage from the plug coupling features. The disengagement of the bracket coupling features from the plug coupling features may detach the plug from the mounting bracket in an unlocked configuration.

Aspect 10 may include or use, or may optionally be combined with the subject matter of Aspect 8 to optionally include or use that the bracket coupling features may be defined in the portal.

Aspect 11 may include or use, or may optionally be combined with the subject matter of one or any combination of Aspects 1 through 10 to optionally include or use an elongate member including a key. The plug may define a keyway. The keyway may be adapted to receive the key. Manipulation of the key may allow the plug to removably attach to the mounting bracket.

Aspect 12 may include or use, or may optionally be combined with the subject matter of Aspect 11 to optionally include or use that the elongate member may have a variable length.

Aspect 13 may include or use, or may optionally be combined with the subject matter of one or any combination of Aspects 1 through 12 to optionally, include or use an indicator. The indicator may be adapted to notify that the pest control device has been engaged.

Aspect 14 may include or use, or may optionally be combined with the subject matter of one or any combination of Aspects 1 through 13 to optionally include or use a plurality of fixation features. The plurality of fixation features may be configured to engage with a fastener, such as to attach the pest control device to the plug.

Aspect 15 may include or use, or may optionally be combined with the subject matter of one or any combination of Aspects 1 through 14 to optionally include or use a cover. The cover may be attached to the mounting bracket. The perimeter of the cavity may be positioned between the cover and the mounting bracket.

Aspect 16 may include or use, or may optionally be combined with the subject matter of one or any combination of Aspects 1 through 15 to optionally include or use a cutter. The cutter may be adapted to create the cavity.

Aspect 17 may include or use, or may optionally be combined with the subject matter of one or any combination of Aspects 1 through 16 to optionally include or use a bait support system including: a bait rod having a first end and a second end; an aperture in the plug configured to receive at least a portion of the first end of the bait rod; a locking mechanism configured to secure the second end so as to lock the bait rod to the plug.

Aspect 18 may include or use, or may optionally be combined with the subject matter of one or any combination of Aspect 17 to optionally include or use wherein the first aperture is disposed in a post extending from the plug.

Aspect 19 may include or use, or may optionally be combined with the subject matter of one or any combination of Aspects 17 or 18 to optionally include or use wherein the bait rod has a hook portion at the second end configured to be received by the locking mechanism.

Aspect 20 may include or use, or may optionally be combined with the subject matter of one or any combination of Aspect 19 to optionally include or use wherein the locking mechanism includes a tab with a ridge to releasably hold at least a portion of the hook portion at the second end.

Aspect 21 may include or use subject matter (such as an apparatus, a system, a device, a method, a means for performing acts, or a device readable medium including instructions that, when performed by the device, may cause the device to perform acts, or an article of manufacture), such as may include or use attaching a pest control device to a plug. The plug may be configured to be removably attached to a mounting bracket. The mounting bracket may be adapted to mount in a hole in a wall or other surface. The plug may substantially close a portal defined by the mounting bracket when the plug is attached to the mounting bracket. The plug may be installed into the mounting bracket to close the portal.

Aspect 22 may include or use, or may optionally be combined with the subject matter of Aspect 21, to optionally include or use that installing the plug may include rotating the plug with respect to the mounting bracket.

Aspect 23 may include or use, or may optionally be combined with the subject matter of one or any combination of Aspects 21 or 22 to optionally include or use positioning a key in a keyway of the plug.

Aspect 24 may include or use, or may optionally be combined with the subject matter of Aspect 23 to optionally include or use that manipulating the key may removably attach the plug with the mounting bracket.

Aspect 25 may include or use, or may optionally be combined with the subject matter of Aspect 23 to optionally include or use that manipulating the key may removably detach the plug from the mounting bracket.

Aspect 26 may include or use, or may optionally be combined with the subject matter of one or any combination of Aspects 21 through 25 to optionally include or use raising or lowering the plug, such as to install the plug into the mounting bracket.

Aspect 27 may include or use, or may optionally be combined with the subject matter of one or any combination of Aspects 21 through 26 to optionally include or use attaching the plug with an elongate member.

Aspect 28 may include or use, or may optionally be combined with any portion or combination of any portions of any one or more of Aspects 1 through 27 to include or use, subject matter that may include means for performing any one or more of the functions of Aspects 1 through 27.

Each of these non-limiting aspects may stand on its own, or may be combined in various permutations or combinations with one or more of the other aspects.

The above description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. The foregoing examples are not intended to be an exhaustive or exclusive list of examples and variations of the present subject matter.

The scope of the invention should be determined with reference to the appended claims, along with the full scope of equivalents to which such claims are entitled.

What is claimed is:

1. A pest control device, comprising:
 a bait support system disposed in an enclosure including a lid, the bait support system including:
  a bait bar having a first end and a second end, the bait bar including at least one angle;
  a bait bar receptacle configured to receive at least a portion of the first end of the bait bar;
  a first post including the bait bar receptacle; and
  a locking mechanism including a tab configured to releasably engage the second end so that the bait bar receptacle and the locking mechanism work together to lock the bait bar to the pest control device independent of a position of the lid of the pest control device.

2. The pest control device of claim 1, wherein the bait bar includes a locking portion proximal the second end, the locking portion adapted to engage with the locking mechanism.

3. The pest control device of claim 2, wherein the first end of the bait bar is retained in the bait bar receptacle when the locking portion is engaged with the locking mechanism.

4. The pest control device of claim 2, wherein the locking portion of the bait bar includes a hook portion.

5. The pest control device of claim 1, wherein the bait bar is configured to pivot between a locked configuration and an unlocked configuration in the pest control device.

6. The pest control device of claim 1, wherein the bait bar includes: a bait support section disposed between the first end and the second end of the bait bar.

7. The pest control device of claim 1, wherein the tab includes a ridge to releasably engage at least a portion of the bait bar proximal the second end.

8. The pest control device of claim 1, further comprising:
a second post configured to, together with the first post, support the bait bar.

9. The pest control device of claim 8, wherein the second post includes an aperture to receive the first end of the bait bar therethrough.

10. The pest control device of claim 9, wherein the bait bar includes a linear portion for holding bait between the first post and the second post, and wherein the bait bar includes a hooked portion securable to the locking mechanism.

11. A pest control device, comprising:
a bait support system disposed in an enclosure including a lid, the bait support system including:
a bait bar having a first end and a second end, the bait bar including at least one angle;
a bait bar receptacle configured to receive at least a portion of the first end of the bait bar; and
a locking mechanism comprising a tab including a ridge configured to releasably engage at least a portion of the second end of the bait bar so that the bait bar receptacle and the locking mechanism work together to lock the bait bar to the pest control device independent of a position of the lid of the pest control device.

12. The pest control device of claim 11, wherein the bait bar includes a locking portion proximal the second end, the locking portion adapted to engage with the locking mechanism.

13. The pest control device of claim 12, wherein the first end of the bait bar is retained in the bait bar receptacle when the locking portion is engaged with the locking mechanism.

14. The pest control device of claim 12, wherein the locking portion of the bait bar includes a hook portion.

15. The pest control device of claim 11, wherein the bait bar is configured to pivot between a locked configuration and an unlocked configuration in the pest control device.

16. The pest control device of claim 11, wherein the bait bar includes:
a bait support section disposed between the first end and the second end of the bait bar.

17. The pest control device of claim 11, further comprising:
a first post including the bait bar receptacle.

18. The pest control device of claim 17, further comprising:
a second post configured to, together with the first post, support the bait bar.

19. The pest control device of claim 18, wherein the second post includes an aperture to receive the first end of the bait bar therethrough.

20. The pest control device of claim 19, wherein the bait bar includes a linear portion for holding bait between the first post and the second post, and wherein the bait bar includes a hooked portion securable to the locking mechanism.

* * * * *

UNITED STATES PATENT AND TRADEMARK OFFICE
CERTIFICATE OF CORRECTION

PATENT NO. : 12,127,545 B2
APPLICATION NO. : 17/698628
DATED : October 29, 2024
INVENTOR(S) : Drake et al.

Page 1 of 1

It is certified that error appears in the above-identified patent and that said Letters Patent is hereby corrected as shown below:

In the Specification

In Column 1, Line 9 (approx.), delete "entitled." and insert --entitled-- therefor Signed and Sealed this
Twenty-fifth Day of February, 2025

Coke Morgan Stewart
*Acting Director of the United States Patent and Trademark Office*